US008656436B2

(12) United States Patent
Kürten

(10) Patent No.: US 8,656,436 B2
(45) Date of Patent: Feb. 18, 2014

(54) SATELLITE RECEPTION AND DISTRIBUTION SYSTEM FOR USE AS A HEAD END WITH PROGRAMMABLE TRANSPONDER CONVERSION OF TRANSPONDER BLOCKS

(75) Inventor: Bernd Kürten, Obermichelbach (DE)

(73) Assignee: Schwaiger GmbH, Langenzenn (DE)

( * ) Notice: Subject to any disclaimer, the term of this patent is extended or adjusted under 35 U.S.C. 154(b) by 210 days.

(21) Appl. No.: 13/130,167

(22) PCT Filed: Nov. 21, 2009

(86) PCT No.: PCT/EP2009/008309
§ 371 (c)(1),
(2), (4) Date: Aug. 11, 2011

(87) PCT Pub. No.: WO2010/057664
PCT Pub. Date: May 27, 2010

(65) Prior Publication Data

US 2011/0296470 A1 Dec. 1, 2011

(30) Foreign Application Priority Data

Nov. 21, 2008 (DE) .................... 20 2008 015 500 U

(51) Int. Cl.
*H04N 7/20* (2006.01)

(52) U.S. Cl.
USPC ................................ 725/70; 725/69; 725/72

(58) Field of Classification Search
USPC ............................................. 725/69, 70, 72
See application file for complete search history.

(56) References Cited

U.S. PATENT DOCUMENTS 5,073,930 A * 12/1991 Green et al. .................... 725/69
7,930,712 B1 * 4/2011 Joseph et al. .................. 725/31

FOREIGN PATENT DOCUMENTS

EP 1 387 512 A2 2/2004
WO 03/094397 A1 11/2003

* cited by examiner

*Primary Examiner* — Kieu Oanh T Bui
(74) *Attorney, Agent, or Firm* — Rankin, Hill & Clark LLP

(57) ABSTRACT

Various designs of configurable multiswitch or multifeed satellite reception systems comprising switch-over matrices and transponder branches and "one cable solutions" which allow or do not allow subsequent expansion with respect to the subscribers that can be connected thereto are known from the prior art. In general, the costs for such systems comprising frequency converters are primarily determined by the frequency converters and the associated filters. The aim of the invention is to devise inexpensive methods or devices which allow detection of the complete frequency spectrum—even after subsequent expansions—and which therefore do not involve any restrictions with respect to the program range. The device for the freely programmable conversion of 1 to m transponders in n transponder blocks (TB1 to TBn) of a satellite reception system comprises the following elements: a satellite antenna (S) comprising at least one LNB reception converter (LNB1, LBN4) to the outputs of which the respective satellite IF plane is applied; a multiswitch (MS) connected to the outputs of the one or more LNB reception converters (LNB1, LNB4); n converters (U) which are arranged in parallel to each other; mid a combinatorial circuit (VS) connected to the converters (U) to combine the n transponder blocks (TB1 to TBn) to an output spectrum, the device making all configured transponders available to every receiver in the manner of a satellite head end. The invention is used in the field of satellite reception and distribution systems as a head end.

17 Claims, 2 Drawing Sheets

Figure 1:
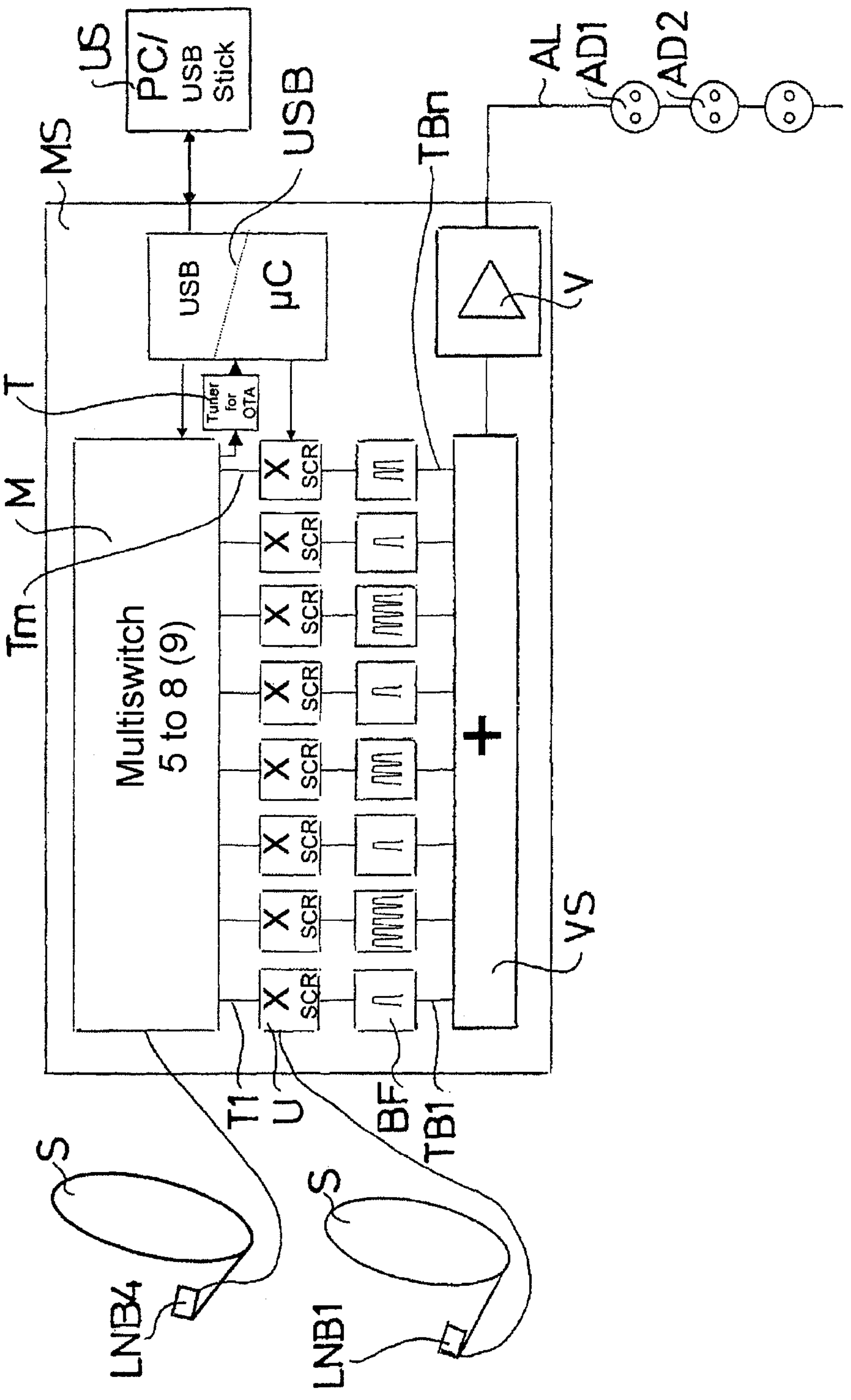

SATELLITE RECEPTION AND DISTRIBUTION SYSTEM FOR USE AS A HEAD END WITH PROGRAMMABLE TRANSPONDER CONVERSION OF TRANSPONDER BLOCKS

The invention relates to an apparatus for the freely programmable conversion of 1 to m transponders into n transponder blocks of a satellite reception and distribution system.

The broadcasting of DVB by satellite, abbreviated to DVB-S (Digital Video Broadcasting-Satellite), for example via Astra, Eutelsat, is the most used variant of DVB. It is advantageous that most television and radio programs and supplementary services can be transmitted in the case of satellite television on account of the large bandwidth. As an example, via the Astra satellites alone, more than 1500 radio and TV programs are transmitted, around 200 programs of which are in each case unencrypted. In contrast to DVB-C (cable) and DVB-T (terrestrial), DVB-S (satellite) does not require additional infrastructure, such as cable networks or terrestrial transmitter chains, and thus offers television and radio reception even in remote regions. There are satellite antennas which, by means of automatic tracking of the antenna, enable reception in aircraft, ships, buses, etc. during travel. DVB-S in part even serves as a data supplier for the cable networks (analog and digital) or DVB-T and contains optimizations for the satellite-specific properties (e.g. lack of reflections, rather poor signal-to-noise ratio) during the transmission of digital data. QPSK modulation is used, wherein symbol rates of greater than 10 000 Msym/s are used in the case of MCPC (=Multiple Channel per Carrier) signals and symbol rates of less than 10 000 Msym/s are used in the case of SCPC (=Single Channel per Carrier) signals. Since, as a result of transmission via satellite in contrast to digital cable signals (DVB-C), a forward error correction (FEC) method becomes necessary, error correction proportions of typically ½ to ⅛ of the total data rate arise in the data stream.

DVB-S2 is a further development of the DVB-S standard and increases the data rate by up to 30% through the use of improved coding, modulation and error correction methods. Instead of 4PSK (QPSK) in the case of DVB-S, DVB-S2 optionally uses 8PSK, 16APSK or 32APSK modulation. The adaptation (ACM Adaptive Control Modulation) is optionally effected by feedback of the reception quality by means of reference receivers, as a result of which, when the reception situation is poor, the modulation can be altered in order to avoid a termination of reception. For the same bit error rate (BER), 8PSK modulation requires a higher carrier-to-noise ratio (CNR) of approximately 3 dB, but this is partly compensated for by the more efficient error correction code LDPC. Inter alia, therefore, a higher net data rate by comparison with DVB-S is also achieved.

The use of better algorithms for picture data reduction (e.g. H.264 (MPEG-4 AVC) instead of H.262 (MPEG-2)) and better resolution (HDTV) is not necessarily coupled to DVB-S2. However, since new terminal devices with other demodulators and decoders are required anyway for newer formats, increasingly (for example if a new HDTV transmitter is put into operation) a compression method that exhibits greater bandwidth efficiency and is therefore more cost-effective (but significantly more computationally intensive) is used. In the case of DVB-S2, the proportion on account of the better correction method is typically only ⅒ of the total data rate.

Currently there are several transponders on different satellites (predominantly Astra and Hotbird) which broadcast in the DVB-S2 mode. On account of the phase angle chosen for the types of modulation newly added in the case of DVB-S2, it is also possible to mix DVB-S and DVB-S2 signaling on one transponder. As a result, a transmitter can offer a number of channels in SDTV, for example for older DVB-S receivers on one transponder, but a DVB-S2 receiver which receives on the same transponder can additionally decode one or two stations present as superimposed 8PSK modulation in DVB-S2 on the 4PSK signal of DVB-S (so-called Simulcast).

In the case of satellite television, ground stations firstly transmit, by means of relatively large parabolic antennas, the television broadcasts recoded into signals to the satellite (so-called uplink), the frequency range being between 10 and 13 gigahertz. The signals are received by the satellite in a receiving unit and forwarded to the transmitting unit (transponder uplink) of the satellite. Typical television satellites (e.g. Astra satellites) are able to receive and transmit at least 16 TV programs and the associated sound. For better utilization of the available frequency range, the satellites carry out emissions on different planes. Emissions on a horizontal and vertical plane and division into a lower frequency band L of 10.7 to 11.7 GHz and an upper frequency band H of 11.7 to 12.75 GHz are customary in this case. Among one another, the individual Astra satellites are only a few kilometers (approximately 140 kilometers) away from one another. By virtue of the great distance from the Earth (36 000 kilometers), the distance between the satellites practically "shrinks" down to a point—the latter is situated at the position 19.2° East. This affords two significant advantages:

1. the system can be received effortlessly by means of a single antenna, and 2. this arrangement makes it possible to receive all at once all of the broadcast channels of the Astra satellites, which are equipped with a total of 64 transponders (transmitting/receiving unit) and operate in the so-called lower frequency band (10.70 to 11.70 gigahertz). For the transmission of digital services (e.g. digital television, digital radio), further satellites are likewise positioned at the position of the other Astra units. The satellites Astra 1E to 1G operate in the upper frequency band (11.70 to 12.75 gigahertz) and are equipped with a total of transponders. With the aid of digital technology (data reduction), a respective transponder of the satellites Astra 1E to 1G is able to transmit up to ten digital television channels (instead of one analog television channel). In this way it is possible to transmit hundreds of digital television channels.

Via the transponders, the signals are sent to the receiving stations on Earth (so-called downlink, Ku band: 10 700 MHz to 12 750 MHz). In the case of cable television, these are large ground stations which are connected to the cable network and feed the corresponding broadcasts in said network. In the case of direct reception, also called direct-to-home satellite broadcasting (DTH), the respective private households with a satellite reception system become small ground stations. The reception system substantially consists of a parabolic antenna (satellite dish), and a satellite receiver. In this case, use is made of a transmission and reception technique on the basis of polarized waves (waves propagate only in a specific direction (oscillation plane)). The converter, which is also designated as LNB (Low Noise Block) or LNC (Low Noise Converter) amplifies and converts the satellite signals from the high frequency range into a lower intermediate frequency range of 950 to 2150 MHz.

If a plurality of subscribers, that is to say a plurality of receivers, are intended to be connected to a satellite antenna or to the converter, then a specific converter for simultaneously receiving a plurality of reception levels is required. In order that the individual subscribers can drive the different outputs of the converter or select the different reception levels independently of one another, a switching apparatus—a so-called “multiswitch” or a “branch device”—, serving as a connection node, is provided in satellite reception systems. In order to change over between the satellites, in the case of simple LNBs a DiSEqC changeover switch is required, whereby each subscriber can then select by changeover between one of the four reception levels mentioned above. In this case, the changeover is effected by virtue of the fact that the subscriber (receiver) passes a switching voltage (14V/18V), a switching frequency (low-frequency audio signal, usually 22 kHz) or a serial control code (e.g. DiSEqC data message, “DiSEqC”=Digital Satellite Equipment Control, which uses a modulated 22 kHz signal) to the multiswitch. In this case, a changeover matrix embodied in the multiswitch connects the respective subscriber to the corresponding input of the multiswitch in accordance with the control signal present.

In practice, it is possible to observe rising complexity of the satellite reception systems, in particular community systems (signal combiner, multiswitch), introduction of digital radio and TV receivers and new services such as Internet, combination device such as multimedia PC, automatic rotation systems, etc., and associated digital remote control concepts. In order to conform to this rising complexity, it is possible to use twin converter arrangements or multifeed systems (i.e. a squint satellite reception system) which consist of a mirror, the multifeed mount and at least two LNBs. It is thus possible that subscribers, independently of one another, can receive programs which are broadcast via one or the other polarization in a lower or upper frequency band, or to receive two or more satellites (e.g. Astra 19.2° E and Hotbird 13° E). A dedicated LNB is required per satellite, said LNBs being fixed on a multifeed mount. Depending on satellite, the distance between the LNBs also has to be dimensioned accordingly. If only two satellites are received, it is also possible to use monoblock LNBs. A monoblock LNB has two horns which have exactly the spacing (e.g. 6° or 3°) in relation to the satellites to be received, and often also have an integrated multiswitch, such that a plurality of receivers can be connected independently of one another.

Satellite head ends are part of satellite distribution systems. Distribution systems can be designed for up to tens of thousands of subscriber connections (cable television). The programs in the customary TV and radio channels are made available to the user at the end via said user’s antenna socket at home. Head end is generally understood to mean the complete reception system, including terrestrially received radio and television programs. For this reason, the manufacturers usually offer not only components for satellite signal conditioning, but also the components for the distribution and/or conditioning of terrestrial TV and radio programs. A head end denotes a system for receiving radio and TV programs for further distribution to end users. The head end can be constructed in various sizes, from the small system for multiple dwellings through to the supply of several towns, counties and districts, that is to say up to hundreds of thousands of residential units. In the hierarchy of the network levels in the cable network, the head end is at ordinal number 2. Within the head end, the received signals from the satellite (analog and/or digital) or the terrestrial antenna (analog/digital) are converted into a frequency range of 47 or 87.5-862 MHz, such that the subscriber in the cable network can reproduce the programs accordingly on said subscriber’s terminal devices such as TV set with analog reception, set-top box for digital reception or radio receiver for VHF reception. Moreover, in the head end, further signals for bidirectional services such as Internet or telephony (TriplePlay) can be admixed in the forward path (downstream) and be received from the return channel (upstream).

Sequence of Program Conversion

1. Reception of the programs from satellite or terrestrially
2. Possible amplification of the input signals
3. Division of the input signals among a plurality of outputs
4. Feeding to the respective converters (analog TV/radio, digital TV/radio, VHF, ADR (Astra Digital Radio))
5. Conversion into a frequency or channel that can be used in cable in the corresponding standard (QAM, PAL, FM)
6. Combination of the converted signals
7. If appropriate, amplification of the combined signals
8. Feeding to the network in the frequency range of 47 or 87.5-862 MHz.

A head end is therefore an alternative to SAT-IF distribution, wherein, as already described above, the SAT signals, after conversion into a lower frequency range (SAT-IF), are distributed via multiswitch (systems) to up to several dozen subscribers. An additional SAT receiver is always necessary in this case. SAT-block distribution is a frequently used variant of the building cabling in which a broadcast reception system enables community operation of a plurality of satellite receivers on one or a plurality of SAT antennas. The main task consists in distributing the signals supplied by the LNB (and terrestrial antennas possibly present) to the individual subscribers. In the case of SAT-block distribution, each SAT receiver (e.g. digital receiver) is connected via a dedicated antenna line, that is to say that the connection structure is star-shaped. Alternatives thereto include the single-cable system and Unicable distribution (standard for distributing satellite TV signals).

A single-cable system restricts reception to a single IF band (950-2150 MHz=1.2 GHz). A preselection usually chooses as the basic frequency band the Astra high band with 11.75-12.75 GHz horizontal; this already makes it possible to receive approximately 300 German-language radio and TV programs. Further additional transponders of other satellite levels are copied into the basic IF band by frequency converters, but it is optional owing to the concentration of German-language satellite programs on Astra Horizontal High. Once an available frequency band is restricted in frequency range, the programs desired for reception have to be selected as in cable television. An RF signal that arises can subsequently be distributed without remote feeding and control signals in a simplified manner in an arbitrarily structured antenna system in extensive residential areas by means of a single coaxial cable (no new cabling required).

In the case of Unicable, a plurality of receivers are connected to a single downlead, which is not possible in the case of SAT-block distribution. In contrast to customary single-cable systems with a limited selection of programs, the full program range is available in the case of Unicable. In the case of Unicable distribution, the choice of a transponder to be received is effected by means of DiSEqC control signals which are transmitted as a superimposition of the remote feed voltage to the LNB/to the Unicable multiswitch by means of the coaxial cable. Instead of a complete IF band (950-2150 MHz=1.2 GHz), the channel router contained in the Unicable LNB or Unicable multiswitch provides only the transponder desired for reception. Thus, a plurality of DVB-S receivers can be operated from one coaxial cable, which enables simple cabling in strand topography (series connection of the antenna sockets). Unicable enables an unrestricted program range and is suitable, in particular, for retrofitting existing apartments with satellite television. An existing coaxial cable into the dwelling with antenna sockets connected in series can continue to be used, in which case, for a plurality of DVB-S receivers, it is merely necessary to switch antenna sockets in the dwelling.

Therefore, a complete frequency band is not transmitted, rather a specific frequency (user band) in the SAT frequency band (950-2150 MHz) is available to each receiver. By means of specific DiSEqC signals, a receiver notifies the distribution unit (LNB or multiswitch) of the level and transponder of the desired program. The transponder is then modulated onto the user band of the receiver. The specific DiSEqC switching signals are necessary for driving a Unicable LNB, for which reason only DVB-S receivers which support this standard function in such a system. A Unicable LNB can usually supply a maximum of four satellite receivers with a signal. The connection of up to 16 receivers is possible, which is not standardized and requires specific receivers.

The Unicable functionality can also be integrated in multiswitches instead of in the LNB. As a result, a mixed line network (conventional distribution and Unicable) is possible, which enables an extensive distribution network and is suitable particularly for bridging the last meter of antenna line in a residential area from the stairwell into apartments (where almost exclusively only one antenna line is available).

A Unicable LNB receives the satellite signals in the same way as a conventional LNB: the four different frequency bands, vertical/low band, horizontal/low band, vertical/high band and horizontal/high band, are in each case amplified in a low-noise fashion and downconverted into the SAT-IF band. They arrive at a built-in multiswitch, which selects the desired reception level for each receiver. A so-called SCR component (SCR satellite channel router) then exists for each receiver that can be connected. Said SCR component, with an adjustable frequency generator (VCO), downconverts the transponder selected by the respective receiver to the user band frequency of said transponder. Afterward, the signal is filtered and fed with corresponding amplification into the coaxial cable. The entire operation is controlled by a central microcontroller, which also decodes the DiSEqC commands of the receivers.

Most commercially available multiswitches have an additional input for the terrestrial signals. Preferably, an antenna combiner or a so-called multiband amplifier with the desired antennas is connected here. Signals from the cable television network can also be fed in on the same path. By means of the multiswitch, these signals are transmitted to the antenna socket by the same cable as the satellite signals. With a suitable antenna socket (so-called three-hole socket), the different signals can be used separately from one another again in the connections.

With the use of services in cable television which require a return channel capability (e.g. Internet or telephone), the return channel capability of the multiswitch is also required.

Special LNBs have an integrated multiswitch having four or eight outputs. Such LNBs are usually designated as quad-LNB or quattro-switch LNB (four outputs) or octo-LNB (eight outputs). Here the receivers can be connected directly to the LNB without an additional multiswitch. Monoblock LNBs for squint installations (multifeed) can also have integrated multiswitches. Here a receiver can be operated at each output; the receivers operate independently, that is to say that each can receive analog and digital TV programs without impairing the reception of the other receiver.

Such multiswitch LNBs are expedient for community systems having a small number of subscribers. A further multiswitch can also be connected to such an LNB, provided that it outputs at its LNB inputs respectively once 14 and 18 V and also (in the case of a digitally compatible device) the 22 kHz signal. Otherwise, the LNB would supply only the vertical low band at all outputs. The use of a quattro-LNB (without an integrated multiswitch) is preferable, however. Better quality should be expected in the case of such a solution with a quattro-LNB and external multiswitch, since the electronics are installed with less confinement, are not exposed to all weathers and the multiswitch normally has its own active power supply.

There is also the possibility of distributing the signals of a plurality of satellites by means of a multiswitch. For this purpose, the multiswitch has a plurality of LNB connections (that is to say another four inputs for each further quattro-LNB). The changeover to the respective LNBs is controlled by the receiver by means of a digital DiSEqC signal. In this case, it is unimportant whether the second LNB is installed on the same SAT antenna (multifeed), or on a second SAT antenna. One LNB is required per satellite; the use of motor-controlled rotating antennas for a plurality of satellites is not possible in the case of community systems with a multiswitch.

Cascadable multiswitches are multiswitches which also have an LNB output for each LNB input. The signals at the inputs are passed on to the outputs unchanged. A further multiswitch of the same type is again connected to said outputs. Cascadable multiswitches are used in large buildings such as residential blocks. The typical installation consists of a SAT antenna and a cascadable multiswitch in each story. The downleads lead from said multiswitch into the residences in the story and four coaxial cables lead to the multiswitch for the next story, etc.

EP 1 760 917 A1 in the name of the present applicant discloses a method for the configuration of n independent subscribers of a satellite reception system comprising an LNB reception converter, a matrix, at least one multiple converter, at least one filter device, a summer or frequency-dividing network or controlled frequency-dividing network or matrix with an adder and at least one antenna line that is shared by the subscribers and routed via connection sockets, wherein the control of the matrix, of m multiple converters arranged in parallel with one another and of the controlled frequency-dividing network or matrix with an adder is effected by means of control signals transmitted via the respective antenna line, as a result of which:

one of the satellite IF levels present at the output of the LNB reception converter is switched through in terms of radio frequency to the output connection of the matrix, and a direct conversion of one of the reception channels present in the satellite IF level into a subscriber channel that can be assigned to the subscriber is effected in the respective multiple converter, and wherein the assignment of the allocation of the subscriber channels is effected centrally, the respectively allocated subscriber channel being stored in a channel memory, such that upon the start-up of a new subscriber of the group connected to a shared antenna line, a non-allocated subscriber channel is assigned to said subscriber, such that each of the subscribers can optionally receive programs at all satellite IF levels.

The method described in EP 1 760 917 A1 has the advantage that, in a surprisingly simple and cost-effective manner, the entire program range can be made available to each of the users, without the risk that, during conversion of the individual programs, the latter can no longer be received. Particularly for relatively large antenna systems which have a very large number of antenna sockets and/or a plurality of main lines and in which more than one subscriber is connected per main line, a cost-effective solution is available by virtue of the measure of allocating a frequency converter (multiple converter) having the corresponding output frequency to a subscriber only upon the start-up of said subscriber. This is because, by means of the dynamic assignment, only m multiple converters (m<=n) are required for n subscribers since, given a typical building installation having n antenna sockets and m residants, generally at most m subscriber connections are simultaneously in operation. Since the costs of such a system having frequency converters are primarily determined by the frequency converters with the associated filters, saving frequency converters means a great saving of costs, particularly in installations where m<<n. By means of the central assignment of the allocation, an access conflict can be avoided in a surprisingly simple and cost-effective manner.

Alternatively, EP 1 760 917 A1 in the name of the present applicant discloses a method:

- wherein the control of the matrix, of m multiple converters arranged in parallel with one another and of the controlled frequency-dividing network or matrix with an adder is effected by means of control signals transmitted via the respective antenna line, as a result of which:
- one of the satellite IF levels present at the output of the LNB reception converter is switched through in terms of radio frequency to the output connection of the matrix, and
- a direct conversion of one of the reception channels present in the satellite IF level into a subscriber channel that can be assigned to the subscriber is effected in the respective multiple converter, and
- wherein the allocation of the subscriber channels is effected in a decentralized manner by virtue of the fact that each newly added subscriber, starting at the subscriber channel having the lowest or highest frequency, checks the allocation state and, upon allocation, changes over to the subscriber channel at a higher or lower frequency,
- such that upon the start-up of a new subscriber of the group connected to a shared antenna line, a non-allocated subscriber channel is assigned to said subscriber, such that each of the subscribers can optionally receive programs at all satellite IF levels.

This alternative method comprising a decentralized dynamic assignment of the allocation as described in EP 1 760 917 A1 has the advantage that an access conflict can likewise be avoided in a surprisingly simple and cost-effective manner.

Furthermore, EP 1 760 917 A1 in the name of the present applicant describes an apparatus for the configuration of n independent subscribers of a satellite reception system, comprising:

- an LNB reception converter, at the outputs of which the respective satellite IF level is present,
- a first matrix connected to the outputs of the LNB reception converter, which matrix loops through the satellite IF levels,
- m multiple converters which are arranged in parallel with one another and which each have a first and a second mixing stage for directly converting one of the reception channels present in the satellite IF level into a subscriber channel that can be assigned to the subscriber,
- a filter device connected to the second mixing stage,
- a summer or frequency-dividing network or controlled frequency-dividing network connected to the filter devices and serving for combining the subscriber channels,
- a control device for controlling the matrix and m multiple converters arranged in parallel with one another,
- at least one antenna line which is shared by a plurality of subscribers and routed via connection sockets,
- such that upon the start-up of a new subscriber of the group connected to a shared antenna line, a non-allocated subscriber channel is assigned to said subscriber, such that each of the subscribers can optionally receive programs at all satellite IF levels.

Alternatively, an apparatus for the configuration of n independent subscribers of a satellite reception system as described in EP 1 760 917 A1 in the name of the present applicant comprises:

- an LNB reception converter, at the outputs of which the respective satellite IF level is present,
- a first matrix connected to the outputs of the LNB reception converter, which matrix loops through the satellite IF levels,
- m multiple converters which are arranged in parallel with one another and which each have a first and a second mixing stage for directly converting one of the reception channels present in the satellite IF level into a subscriber channel that can be assigned to the subscriber,
- a filter device connected to the second mixing stage,
- a second matrix with adder, said second matrix being connected to the filter devices,
- a control device for controlling the two matrices and the m multiple converters arranged in parallel with one another, and
- antenna lines which in each case are connected to the second matrix and are shared by the respective group of subscribers and are routed via connection sockets,
- such that, upon the start-up of a new subscriber, the latter is assigned a non-allocated subscriber channel from the m multiple converters arranged in parallel with one another and the second matrix is switched through to the respective antenna line, such that each of the subscribers can optionally receive programs at all satellite IF levels.

Furthermore, an apparatus described in EP 1 760 917 A1 in the name of the present applicant comprises:

- an LNB reception converter, at the outputs of which the respective satellite IF level is present,
- a matrix connected to the outputs of the LNB reception converter, which matrix loops through the satellite IF levels,
- m multiple converters which are arranged in parallel with one another and which each have a first and a second mixing stage for directly converting one of the reception channels present in the satellite IF level into a subscriber channel that can be assigned to the subscriber,
- a frequency-dividing network connected to the multiple converters and consisting of adders and switches,
- a control device for controlling the matrix, the frequency-dividing network and the m multiple converters arranged in parallel with one another, and
- antenna lines which in each case are connected to the frequency-dividing network and are shared by the respective group of subscribers and are routed via connection sockets, such that, upon the start-up of a new subscriber, the latter is assigned a non-allocated subscriber channel from the m multiple converters arranged in parallel with one another and the frequency-dividing network is switched through to the respective antenna line, such that each of the subscribers can optionally receive programs at all satellite IF levels.

Finally, a device described in EP 1 760 917 A1 in the name of the present applicant comprises:

- an LNB reception converter, at the outputs of which the respective satellite IF level is present, a first matrix connected to the outputs of the LNB reception converter, which matrix loops through the satellite IF levels, m multiple converters which are arranged in parallel with one another and which each have a first and a second mixing stage for directly converting one of the reception channels present in the satellite IF level into a subscriber channel that can be assigned to the subscriber, a filter device connected to the second mixing stage, a second matrix with adder, said second matrix being connected to the filter devices, a control device for controlling the two matrices and the m multiple converters arranged in parallel with one another, and antenna lines which in each case are connected to the second matrix and are shared by the respective group of subscribers and are routed via connection sockets, such that, upon the start-up of a new subscriber, the latter is assigned a non-allocated subscriber channel from the m multiple converters arranged in parallel with one another and the second matrix is switched through to the respective antenna line, such that each of the subscribers can optionally receive programs at all satellite IF levels.

The above-described embodiments of the apparatus according to EP 1 760 917 A1 in the name of the present applicant have the advantage that in relatively large buildings it becomes possible to construct satellite distribution systems without restrictions as in known "single-cable solutions", primarily the fact that only a specific segment from the entire program range is available. For the fitter, in particular, this apparatus in accordance with EP 1 760 917 A1 entails considerable simplifications since expansion by a new subscriber in the case of a tree structure does not automatically mean the laying of a new antenna cable (star structure) as in the prior art. Furthermore, this apparatus in accordance with EP 1 760 917 A1 can be used independently of the structural conditions and enables the flexible assignment and controlled changeover of transponders for the provision of subscribers via an IF channel fixedly assigned to the subscribers. Preferably, identical subscriber channels can be simultaneously allocated in the different groups, wherein expansion of one of the groups up to full capacity is possible at any time by means of the group-by-group allocation of a respective antenna cable, without this simultaneously meaning reprogramming in one of the other groups. Furthermore, by means of a software update in the control device, the desired configuration can be performed at any time and manipulation at the subscriber end can be reliably avoided by means of the control device checking, prior to each change, the authorization in respect thereof. This central dynamic assignment of the allocation reliably avoids access conflicts and allows at any time the desired configuration, including the possibility of remote configuration and/or remote diagnosis (via ISDN, WAN, LAN, Internet) and/or blocking of specific frequencies (chargeable channels from a service provider or as a type of parental lock). Preferably, by means of the actuation of tip switches on the satellite receiver or in a menu-controlled manner, the continuous reconfiguration of the allocation state is "frozen", wherein the user can be satisfied about proper operation of the satellite receiver at any time by direct visual inspection. The "freezing of the allocation state" that is to say the quasi-static operation of the system, has the advantage that the times for the evaluation of a desire for access or allocation of the subscriber channel can be considerably shortened.

In order to further develop the known methods or apparatuses in such a way that, for channels having a limited bandwidth, a transponder selection is made which is compatible with commercially available satellite receivers, DE 20 2007 017 295 U1 in the name of the present applicant discloses a satellite reception and distribution system in the domestic sector comprising wireless and wired transmission links and feeding of a plurality of transponders, comprising:

a satellite antenna with at least one LNB reception converter, at the outputs of which the respective satellite IF level is present, a multiswitch connected to the outputs of the LNB reception converter(s), at least one first transmitting/and receiving device connected to the multiswitch and a first antenna, and at least one second transmitting/and receiving device which is connected to a second antenna and which can be connected to the user's receiver, thereby enabling, on the part of the user, flexible assignment and controlled transmission of transponders for each of the user's receivers.

This satellite reception and distribution system in accordance with DE 20 2007 017 295 U1 in the name of the present applicant has the advantage that wireless TV transmission by means of the W-Lan standard (preferably 802.11n) with, in particular, a Unicable protocol is made possible in a surprisingly simple and cost-effective manner. Furthermore, it is advantageous that a retrofittable W-Lan "transmitter" can be connected directly to an antenna socket or to the multiswitch. Further advantages are the connection of a plug +play "receiver" with a Unicable STB or a notebook particularly with 802.11n W-Lan and corresponding software. One development provides for the transponder information originating from the user's receiver to perform the control of the multiswitch (e.g. IF level selection) by means of a control device (MS-control). In this case, the first transmitting/and receiving device has a transceiver connected to the first antenna, and, connected to said transceiver, a demodulator and tuner connected to the multiswitch. Alternatively, the second transmitting/and receiving device has a transceiver which is connected to the second antenna and which is connected both to a modulator and to a decoder, and modulator and decoder are connected to the user's receiver.

Finally, DE 295 11 322 U1 discloses an antenna reception system, comprising an apparatus for selecting and converting channels of a plurality of antennas and/or polarization planes and for coupling out desired channels onto a domestic service cable via which the channels can be fed to the subscribers. In order that, without intervention by the individual subscribers and with relatively low outlay, desired channels of a plurality of antennas and/or polarization planes are made available to the subscribers connected via a common domestic service cable, the apparatus is embodied as a reordering device for reordering the channels within the entire frequency band available, wherein an intersection of the channels not desired by all subscribers can be coupled out before connection onto the common domestic service cable, wherein the remaining desired channels of all of the antennas and/or polarization planes can be converted into mutually non-overlapping channels, and wherein the frequency band thus conditioned can be connected onto the common domestic service cable. By virtue of these measures, the entire frequency band available for all antennas or the polarization planes is freed of those channels which the subscribers deem to be uninteresting anyway (e.g. for linguistic reasons or for lack of corresponding coding devices). Instead, of all the connected antennas or all the polarization planes, an expedient selection of desired channels is made, which are then available to each subscriber, without individual interventions by the individual subscribers being necessary or possible. The measure that the reordering device has channel selectors connected downstream of respective inputs and also converters connected downstream of said channel selectors per channel and serving for converting the chosen channels into a second intermediate frequency, and that the channels converted into the second intermediate frequency can be converted, by means of a reconverter, into the envisaged frequency ranges of the conditioned frequency band, has the advantage that, by means of the conversion into the intermediate frequency, which can be identical for all the channels, it is possible to use identically constructed, commercially available conditioning circuits which, if appropriate, only have to be slightly modified. As a result, the construction is inexpensive and simple and, moreover, owing to the high integration density, compact. In particular, the possibility of very sharp band limiting is afforded, as a result of which disturbances of adjacent channels are practically completely ruled out. The conditioned frequency band is fed in a simple manner by virtue of the fact that the reordering device has, before its output, a collector array by means of which the reordered channels are combined and fed to the domestic service channel. For the rearrangement of the antenna reception system and adaptation to a changed range of channels or in the case of changed desires of the subscribers, a construction is favorable in which it is provided that the reordering device, for selecting the channels and for conversion into the envisaged frequency ranges of the conditioned frequency band, has a programmable control device with a display device and adjusting keys. The antenna reception system can thereby be coordinated with the changed conditions rapidly and without technical complexity. The construction can be simplified by looping through a continuous block of channels in an antenna and feeding it via a filter to a loop-through input of the reordering device. If modified commercially available SAT tuners are used, identical conditions in the conditioning are provided for all the channels with little technical complexity. For the frequency band between 950 MHz and 2150 MHz, a second intermediate frequency around 480 MHz is advantageous in this case. A good utilization of the available frequency band and a considerable simplification in the design of the antenna reception system are achieved by virtue of the fact that a dynamic channel allocation is formed by means of the programmable control device, such that, in the conditioned frequency band, the channels can be strung together in a continuous fashion, despite different bandwidths. Corresponding distributors are suitable for feeding the channels to the inputs of the reordering device. A reordering device can be accommodated e.g. in a housing having twelve input connections and can have a corresponding number of paths for the signal conditioning. Depending on the number of desired channels from each antenna or each polarization plane, a varying number of inputs of the reordering device can be allocated by an antenna or polarization plane. Moreover, a plurality of individual housings can be provided in order to achieve the maximum number of channels to be accommodated in the frequency band to be conditioned.

As shown by the above acknowledgement of the prior art, variously embodied configurable multiswitches or multifeed satellite reception systems comprising changeover matrices and transponder branches and "single-cable solutions" with or without the possibility of subsequent expansions with regard to the subscribers that can be connected are known. In general, the costs of such systems with frequency converters are primarily determined by the frequency converters with the associated filters. The same similarly holds true for the flexible assignment and controlled conversion of transponders in accordance with the various embodiments of the apparatus according to EP 1 760 917 A1, in the name of the present applicant, in order to enable subsequent expansion, or in the case of the antenna reception system in DE 295 11 322 U1 with expedient selection of desired channels. Accordingly, the transponder to be transmitted has to be selected and in practice there is a lack of cost-effective methods or apparatuses in which—also in the case of subsequent expansions—the complete frequency spectrum is detected and there are therefore no restrictions with regard to the program range. This is particularly significant because consumer electronics, in particular the industry that produces satellite reception systems, has for many years been regarded as an extremely advanced, development-oriented industry which rapidly takes up and actually implements improvements and simplifications.

Against the background of the known methods or apparatuses, the invention is based on the object of developing them further in such a way that the conversion of whole transponder blocks is freely programmable, and that this is compatible with commercially available satellite receivers, including those without Unicable control.

This problem is solved according to the invention, in the case of an apparatus for the freely programmable conversion of 1 to m transponders into n transponder blocks of a satellite reception and distribution system, in that said apparatus comprises:

- a satellite antenna with at least one LNB reception converter, at the outputs of which the respective satellite IF level is present,
- a multiswitch connected to the outputs of the LNB reception converter(s),
- n converters arranged in parallel with one another, and
- a combination circuit connected to the converters and serving for combining the n transponder blocks to form an output spectrum, such that the apparatus makes all the configured transponders available to each receiver in the manner of a satellite head end.

The satellite reception and distribution system according to the innovation in the form of a head end with programmable transponder conversion of transponder blocks has the advantage that normal receivers are used in a surprisingly simple and cost-effective manner in the present configuration since the configuration is usually not changed dynamically. In the case of the apparatus according to EP 1 760 917 A1 in the name of the present applicant, precisely one transponder was made available to the receiver, which the latter had itself requested beforehand. In the case of the concept according to the innovation, all configured transponders are available to each receiver. Consequently, as in the case of a normal head end, theoretically as many subscribers as desired can be simultaneously connected to a cable.

In a development of the innovation, for remote configuration, including update, and/or for remote diagnosis, a control device is connected to the multiswitch and an interface circuit.

This development of the invention has the advantage of enabling diverse programming possibilities/interfaces through to remote programming via an extended DiSEqC protocol—in a manner similar to that in the case of Unicable.

Preferably, transponder blocks filtered by a surface acoustic wave filter and other transponder blocks alternate from parallel branch to parallel branch.

The alternating arrangement between discretely constructed and SAW filters (an SAW filter (surface acoustic wave filter) is a steep-edged, cost-effective bandpass filter) in the individual branches enables the filter costs to be significantly reduced in a surprisingly simple manner.

In one embodiment of the invention, adjustable amplifiers for the transponder blocks are arranged for realization in the manner of an equalizer in the parallel branches.

This embodiment of the innovation has the advantage of achieving, in each influencable frequency band of the branches, by means of the combination of adjustable amplifiers and bandpass filters, a flat profile of the absolute frequency response in the passband with very good blocking above and below the cut-off frequency of the respective filter.

Figure 2:
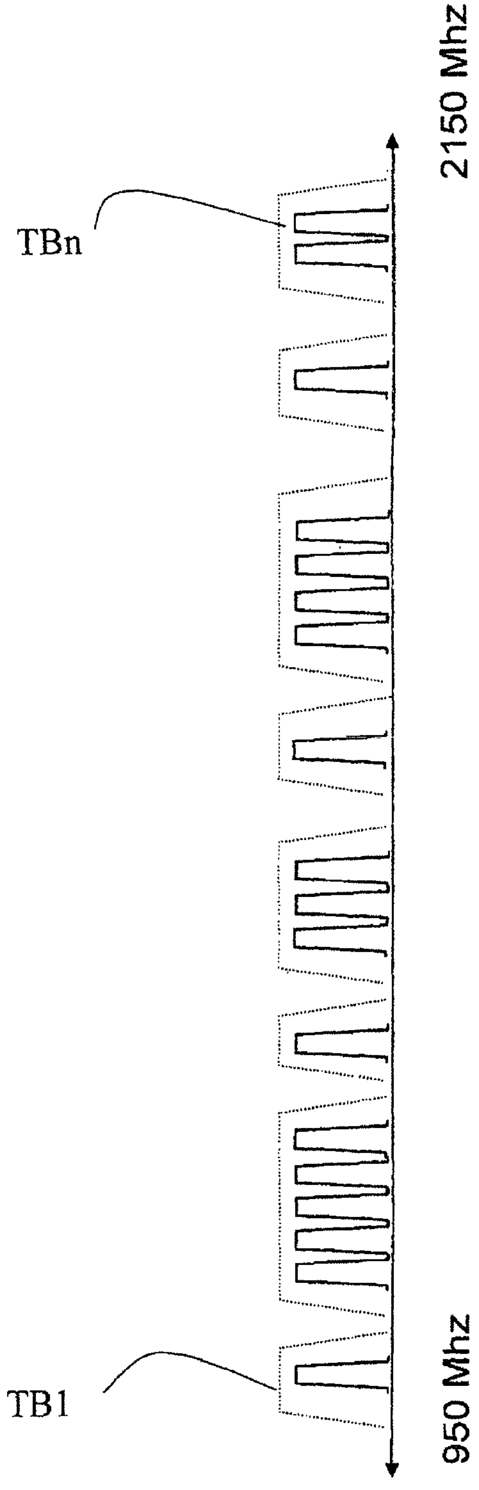

Further advantages and details can be gathered from the following description of a preferred embodiment of the innovation with reference to the drawing, in which:

FIG. 1 shows the block diagram of a preferred embodiment of a satellite head end with programmable transponder conversion of transponder blocks, FIG. 2 shows a schematic illustration of the reception frequency band for an exemplary embodiment with eight converters for a satellite head end according to FIG. 1.

The block diagram of a preferred embodiment as illustrated in FIG. 1 shows the satellite head end (DVB-S or DVB-S2) according to the invention with programmable transponder conversion of transponder blocks. In detail, the apparatus serves for the freely programmable conversion of 1 to m transponders T1, . . . , Tm into n transponder blocks TB1 to TBn. For this purpose, provision is made of a satellite antenna S with at least one LNB reception converter LNB4, at the outputs of which the respective satellite IF level is present, and they are fed to a multiswitch MS connected thereto. The quattro-LNB reception converter LNB4 illustrated in FIG. 1 converts the horizontally and vertically polarized satellite signals from the high frequency range, namely a lower frequency band L of 10.7 to 11.7 GHz and an upper frequency band H of 11.7 to 12.75 GHz, into a lower intermediate frequency range of 950 to 2150 MHz (see FIG. 2). m converters U having an adjustable output level which are arranged in parallel with one another are connected to the multiswitch MS, the transponder blocks TB1 to TBn of which converters are combined in a combination circuit VS, which is connected to the converters U, to form an output spectrum. A fixed or adjustable amplifier V is connected to the combination circuit VS, and an antenna line AL that is shared by each user receiver and is routed via connection sockets AD1, AD2, . . . is connected to said amplifier, such that all configured transponders (from T1, . . . , Tm) are made available thereto. The antenna line AL furthermore has a connection socket as terminal socket for the characteristic-impedance-conforming termination with a terminating resistor (not illustrated in the drawing). The combination circuit VS is embodied as a summer or frequency-dividing network or controlled frequency-dividing network for combining the filtered transponder blocks TB1, . . . , TBn. It is particularly favorable in terms of outlay if the frequency-dividing network VS consists of adders.

In the embodiment illustrated in FIG. 1, the multiswitch MS has a matrix M, which is connected to the outputs of the LNB reception converters LNB1, LNB4 and which loops through the satellite IF levels. In this case, the quad-LNB LNB4 is connected to the matrix M and the single-LNB LNB1 is directly connected to a converter U. As a result, for foreign programs, it is also possible to provide a fifth SAT input for an individual converter U.

For remote configuration, including update, and/or for remote diagnosis, a control device μC is connected to the multiswitch MS and an interface circuit USB. The interface circuit USB is preferably embodied as a USB interface via which a USB stick US or a PC can be connected for the configuration of the multiswitch MS/the matrix M. The USB stick US can also have a program for configuration, which can be displayed on the user's receiver. In order to realize an Over-The-Air update, finally, a tuner T is connected to the control device μC. Optionally, the configuration or the program for configuration is linked with the inputting of a key (for example by means of the remote control or keypad of the receiver or of the tuner T or of the multiswitch MS).

According to the invention, the multiswitch MS/the matrix M is configurable in such a way that transponder blocks TB1 to TBn of identical or different satellite IF levels are tapped off. A filter BF is connected to each of the converters U, the bandwidth of said filter either being fixed or configurable by means of the control device μC in accordance with a number of transponders. In this case, transponder blocks filtered by a surface acoustic wave filter and other transponder blocks (TB1 to TBn) can alternate from parallel branch to parallel branch. Preferably, adjustable amplifiers (not illustrated separately in the drawing) for the transponder blocks TB1 to TBn are arranged for realization in the manner of an equalizer in the parallel branches. In this case, the gain (including the amplifier V) can be changed in a program-controlled manner.

FIG. 2 shows a schematic illustration of the reception frequency range for an exemplary embodiment with eight converters U for a satellite head end according to FIG. 1. In this case, up to 150 programs in the frequency range between 950 MHz and 2150 MHz can be made available by means of the eight converters U (in each case a maximum of twenty-five transponders).

In one development of the invention, the converters U are embodied in such a way that the frequency conversion of the reception frequency is effected without the detour via satellite IF levels. Furthermore, in one development of the invention, the multiswitch MS can have a control device for evaluating the control signals coming from the user's receiver, which control device enables a configuration of the system via the antenna line.

The invention claimed is:

1. An apparatus for the freely programmable conversion of 1 to m transponders into n transponder blocks (TB1 to TBn) of a satellite reception and distribution system, comprising:

a satellite antenna (S) with at least one LNB reception converter (LNB4) having outputs where respective satellite IF levels are present, a multiswitch (MS) connected to the outputs of the at least one LNB reception converter (LNB4), wherein the multiswitch (MS) has a matrix (M) that loops through the satellite IF levels, n converters (U) arranged in parallel with one another, which are connected to the multiswitch (MS), a control device (μC) connected to the multiswitch (MS), a programmable filter (BF) connected to each of the converters (U), wherein a bandwidth of said programmable filter (BF) is configurable by the control device (μC) in accordance with a number of transponders in each transponder block (TB1 to TBn), and a combination circuit (VS) connected to the converters (U) and serving for combining the n transponder blocks (TB1 to TBn) to form an output spectrum, wherein at least one antenna line (AL), which is shared by a plurality of subscribers with connected receivers, is connected to the combination circuit (VS) and is routed via connection sockets (AD1, . . . , ADn) such that the apparatus makes all configured transponders available to each connected receiver of said plurality of subscribers in the manner of a satellite head end.

2. The apparatus as claimed in claim 1, wherein for remote configuration, including update, and/or for remote diagnosis, said control device (μC) is connected to an interface circuit (USB).

3. The apparatus as claimed in claim 2, wherein the interface circuit (USB) is embodied as a USB interface, via which a USB stick can be connected for the configuration of the multiswitch (MS).

4. The apparatus as claimed in claim 2, wherein, for realizing an Over-The-Air-Update, a tuner (T) is connected to the control device (μC).

5. The apparatus as claimed in claim 3, wherein the USB stick has a program for configuration which can be displayed on a user's receiver.

6. The apparatus as claimed in claim 5, wherein the program for configuration is linked with the inputting of a key.

7. The apparatus as claimed in claim 1, wherein the multiswitch (MS) is configurable in such a way that transponder blocks of identical or different satellite IF levels are tapped off.

8. The apparatus as claimed in claim 1, wherein some satellite IF levels are connected via the matrix (M) and others are connected directly to the converters (U).

9. The apparatus as claimed in claim 1, wherein at least some transponder blocks (TB1 to TBn) are filtered by a surface acoustic wave filter and wherein said filtered transponder blocks and other non-filtered transponder blocks (TB1 to TBn) alternate from parallel branch to parallel branch.

10. The apparatus as claimed in claim 9, wherein adjustable amplifiers for the transponder blocks (TB1 to TBn) are arranged for realization in the manner of an equalizer in the parallel branches.

11. The apparatus as claimed in claim 10, wherein gain is variable in a program-controlled manner.

12. The apparatus as claimed in claim 1, wherein the multiswitch (MS) is integrated in the at least one LNB reception converter (LNB4) or in a monoblock.

13. The apparatus as claimed in claim 1, wherein the converters (U) are integrated in the LNB reception converter (LNB4) or in a monoblock.

14. The apparatus as claimed in claim 1, wherein a fixed or adjustable amplifier (V) is arranged between combination circuit (VS) and the antenna line (AL).

15. The apparatus as claimed in claim 1, wherein the converters (U) are embodied in such a way that frequency conversion of reception frequency is effected without detour via the satellite IF levels.

16. The apparatus as claimed in claim 1, wherein the combination circuit (VS) is embodied as a summer or frequency-dividing network or controlled frequency-dividing network for combining the filtered transponder blocks (TB1, . . . , TBn).

17. The apparatus as claimed in claim 1, wherein up to 150 programs in a frequency range between 950 MHz and 2150 MHz can be made available by means of eight converters (U) and twenty-five transponders.

* * * * *